United States Patent [19]
Barghouti et al.

[11] Patent Number: 5,608,908
[45] Date of Patent: Mar. 4, 1997

[54] PROCESS CONTROL SYSTEM RESPONSIVE TO DEVICE EVENTS

[75] Inventors: Naser S. Barghouti, Clifton; Balachander Krishnamurthy, Chatham, both of N.J.

[73] Assignee: Lucent Technologies Inc., Murray Hill, N.J.

[21] Appl. No.: 539,000

[22] Filed: Oct. 5, 1995

Related U.S. Application Data

[63] Continuation of Ser. No. 118,982, Sep. 8, 1993, abandoned.
[51] Int. Cl.⁶ ............................. G06F 11/30; G06F 15/20
[52] U.S. Cl. ........................... 395/703; 395/500; 395/76; 395/704; 395/680
[58] Field of Search ................................... 364/578, 488; 395/500, 650, 76

[56] References Cited

U.S. PATENT DOCUMENTS

| | | | |
|---|---|---|---|
| 5,155,842 | 10/1992 | Rubin | 395/575 |
| 5,355,484 | 10/1994 | Record et al. | 395/650 |
| 5,384,720 | 1/1995 | Ku et al. | 364/578 |
| 5,426,768 | 6/1995 | Kanazawa | 395/500 |

*Primary Examiner*—Ayaz R. Sheikh
*Assistant Examiner*—Jeffrey K. Seto

[57] ABSTRACT

Techniques for controlling a process which is performed at least in part by a device such as a computer operating system. The techniques involve a process server which controls the process in response to indications that steps of the process have taken place, an envelope which encloses the device and generates event messages when the device performs operations, and a translator which translates steps of the process into sequences of events and monitors the event messages. When the translator determines that a sequence of events which constitute a process step has occurred, it provides an indication that the step has occurred to the process server. In a preferred embodiment, the device is an operating system, the envelope is a dynamically-linked library of file system commands, the translator includes the Yeast event-action system, and the process server is a process control system which models entities involved in the process as objects and makes state transitions by firing rules which modify the objects.

12 Claims, 5 Drawing Sheets

THE PRIOR ART

PROCESS CONTROL SYSTEM RESPONSIVE TO DEVICE EVENTS

This application is a continuation of application Ser. No. 08/118,982, filed on Sep. 8, 1993, now abandoned.

BACKGROUND OF THE INVENTION

1. Field of the Invention

The invention is directed generally towards the controlling of the execution of process steps and more specifically towards controlling of process steps performed via a computer system where users specify a representation of the process whose execution is controlled by the computer system.

2. Description of the Prior Art

A process is an ordered set of steps to be followed in attaining an end. The end of the process may be an article of manufacture, an item such as a computer program, a business plan, or a design, or a change of status (for example, a permit to begin construction). In the following discussion, developers is used to refer to the humans who carry out the process.

Processes may vary across organizations and systems. A process step corresponds to a set of events that occur on entities. When the process involves a computer, many of the events will occur within the computer system. We say that a step has occurred when the corresponding set of events have occurred. For example, a process step may correspond to the invocation of a particular software tool on a particular entity to accomplish a task, such as a manager reviewing and formatting a document using an editor. In this case, the software tool is the editor and the step corresponds to the following events: the manager invokes the editor, the editor opens the document, the manager modifies the document, and finally the manager terminates the invocation of the editor. A process step may also correspond to events that occur outside the computer system, such as holding a decision-making meeting; the beginning and completion of the step must be announced explicitly by a user.

Typically, the steps of a process must be carried out in a particular order. The ordering is not necessarily serial; steps can occur in parallel. Additionally, the ordering can either be partial (only some steps must be executed in a particular order) or total (the ordering of steps is strict).

Work in the field of process control has focused on two aspects: (1) devising useful notations, called process modeling languages, by which the desired process is specified; and (2) investigating process control mechanisms by which computers may assist users in carrying out the specified processes.

A process control system is a computer system that provides a process modeling language for specifying processes and provides computer-aided control over the execution of such processes. A variety of process modeling languages have been proposed, including rule-based languages, Petri Net-based languages and procedural languages. The forms of computer-aided process control also vary; existing process control systems can: (1) monitor the actual development of the end product in order to verify that users are following a particular process; (2) automate parts of the process; and (3) enforce a specific process.

As mentioned earlier, a process step may correspond to events that occur on entities that are within the computer system or outside it. Monitoring is possible only for entities accessible from the computer system. These include files, devices, and executable programs. The process control system must be notified about the occurrence of the events that occur on these entities. This notification can be done in a variety of ways. One way is to force the activities that cause the events to send messages announcing the occurrence of events. Another way is by simply having the user directly notify the process control system of the occurrence of events. A third way is to have the occurrences of such events (for example, the contents of a file changing) automatically detected and reported to the process control system. All prior-art process control systems known to the inventors use one of the first two approaches. The invention described herein uses the third approach.

Automation and enforcement of the process depend on the ability of the process control systems to monitor the process. The system automates parts of the process by automatically performing steps that developers would have performed manually. Enforcement ensures that the performance of process steps follows the specified ordering of the steps.

These forms of computer-aided process control, if provided in as non-intrusive a manner as possible, are particularly useful in supporting software engineering, design and project management processes. Several process control systems have been proposed and some have been built in the past few years. Many of these systems are described in various papers in *Proceedings of the Eighth International Software Process Workshop*, Schaefer (ed.), Wadern, Germany, March, 1993.

We divide the prior art into two categories: the monolithic process control system approach and the tool-based process control system.

In the monolithic approach the process control system is a stand-alone entity that does not interact with external components. In this approach, developers work entirely within the environment created by the process control system; i.e., all interaction between the developers and the tools used to develop the end product is done via the process control system. Users execute all process steps directly and explicitly notify the process control system about all process related events. The advantage of this approach is that it allows complete control of the process. The control extends to events that do not correspond to tool invocations. The consequence of this approach, however, is that the tools that perform process steps, e.g., editors and compilers, must all be somehow made part of the process control system.

One example of this approach is the Marvel system described by Naser Barghouti and Gall Kaiser in "Scaling Up Rule-Based Development Environments", *Proceedings of the Third European Software Engineering Conference*, Milan, Italy, 1991, pp. 380–395. Another example is Process Weaver described by Maryse Bourdon in "Building Process Models using PROCESS WEAVER: a Progressive Approach," *Proceedings of the Eighth International Software Process Workshop*, Wadern, Germany, March, 1993, pp. 40–42.

FIG. 4 depicts the tool-based approach. The process control system in this approach consists of four major parts: a Process Server (101), a Policy Translator (403), a Message Multicaster (408) and a set of Tool Envelopes (405).

The Process Server (101) conveys to the Policy Translator (403) the set of events corresponding to process steps that must be monitored (402). These events correspond to actions carried out by any of a particular set of tools (404) used by the developers. An example of such an event is an editor modifying a particular file. Policy Translator (403) translates these events into a set of tool messages that should be monitored (407). This set of tool messages is stored in the Message Multicaster (408), which then monitors the specified tool messages. An inherent problem of the tool-based approach is that it can only monitor events produced by a fixed set of tools. Events produced by other entities or by users of the system cannot be monitored.

A tool (404), such as an editor, typically does not send messages indicating the actions it has performed, such as modifying a file. Since such messages are required for monitoring, the tools (404) are enveloped. A tool envelope (405) is written by a user to encapsulate a tool (404). An envelope sends messages to interested parties, such as process control system, about actions performed by the tool. For example, an editor envelope could send a message to interested parties notifying them that it has modified the contents of a particular file. The concept of envelopes was disclosed by Mark Dowson in "Integrated Project Support with IStar," *IEEE Software*, volume 4, number 6, November, 1987, pp. 6–15. Another example of tool enveloping has been disclosed by Steve Reiss in "Connecting Tools Using Message Passing in the Field Environment", *IEEE Software*, July 1990, pp. 57–66.

The messages (406) generated by the tool envelopes (405) are sent to the Message Multicaster (408). The Message Multicaster (408) matches these messages against the tool messages it has to monitor (407) and informs the Policy Translator (403) via tool message notifications (409). The Policy Translator processes these tool message notifications and converts them to event notifications (410), which are sent to the Process Server (101). The Process Server (101) uses these notifications to control the process under purview.

The tool-based approach removes the restriction that all development has to be done from within the process control system. This has the advantage of allowing users to use the tools of their choice, given that envelopes have been provided for the tools. See D. Garlan and E. Ilias in "Low-cost, Adaptable Tool Policies for Integrated Environments", *Proceedings of the Fourth ACM SIGSOFT Symposium on Software Development Environments*, Irvine, Calif., 1990. pp. 1–10.

Both of the approaches in the prior art suffer from major drawbacks. The monolithic process control system approach assumes that organizations adopting process technology will alter their working environment significantly. The reason is that developers must now interact only with the process control system instead of the tools with which they are familiar. Events corresponding to process steps that occur outside the process control system cannot be tracked unless the users explicitly notify the process control system about them.

It is very difficult to convince developers to move to a completely new environment, especially when the advantages of process control system environments over more traditional environments have not yet been demonstrated. Furthermore, the need to make everything usable within the process control system environment has made it difficult to integrate existing technology or use new technology.

The tool-based approach requires that all tools used must be enveloped to permit interaction via a centralized message server. The developers thus cannot use a new tool without enveloping it. It is difficult to keep track of which tools have been enveloped and which have not, especially in organizations where tools are updated and modified frequently. Further, enveloping a tool may not always be straightforward and may require considerable human effort.

What is needed, therefore, and what the art has not yet provided, is an open process control system that permits a user to retain his/her current working environment (e.g., all the tools in the system), automatically detects events on entities of interest to the process, and uses this information to control the process.

SUMMARY OF THE INVENTION

The invention overcomes the foregoing problems by monitoring events in a device which is involved in the performance of the process steps, determining when the events indicate that a step in the process is completed, and sending an indication of the completion of the step to the process server. Since the invention monitors events in a device, the monitoring is completely automatic; further, because the invention monitors events in the device instead of events in tools, users of the invention may use any tools they wish.

A particularly advantageous species of the invention is one in which the device in which the events are monitored is the operating system of a computer system. Another advantageous species includes a process server, the device, and a translator which translates the representation of a process step used in the process server to a representation of the step as a sequence of events and then monitors the events until a sequence defining a step is detected; at that point, the translator provides a notification to the process server that the step has occurred. In this species, the process server may be a process control system of the monolithic type. The process control system responds to the notification from the translator in the same fashion in which it responds to notifications from within the process control system.

The foregoing and other objects and advantages of the invention will be apparent to one of ordinary skill in the art who peruses the following Drawing and Detailed Description, wherein:

Figure 1:
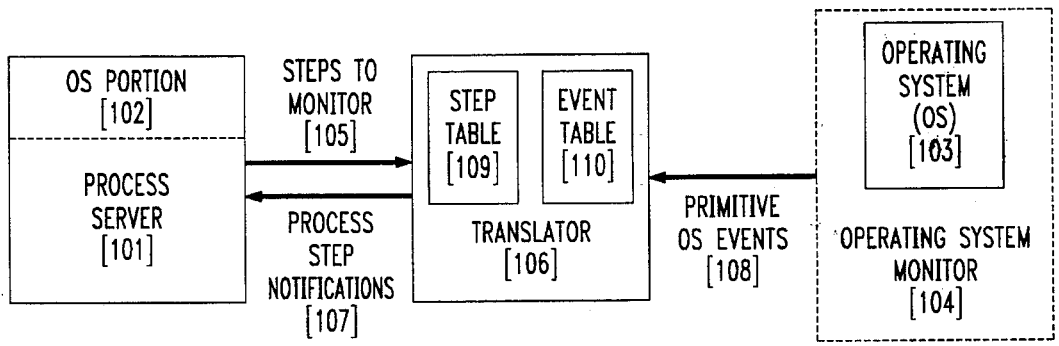
FIG. 1 is an overview of the architecture of a preferred embodiment of a process control system.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

Architecture of the Preferred Embodiment

The architecture of the preferred embodiment of the process control system, shown in FIG. 1, is now described.

The process under purview is modeled in the Process Server (101). The Operating System portion (102) of this process server models steps of the process that correspond to actions performed on entities that reside on the native Operating System (103), such as modifying a file, invoking a tool, and using a device. The steps modeled in the Operating System portion (102) are the ones that can be automatically monitored. A set of these steps is generated (105) and conveyed to the Translator (1.6), which stores the set of steps in the Step Table (109) and from this table generates an Event Table (110). The Event Table contains the primitive Operating System events that correspond to the steps stored in the Step Table (109). A single process step may correspond to a sequence of primitive Operating System events. For example, the step "review document" may correspond to four primitive events: invoke the editor, open the document, read and perhaps modify the document, and close the document.

The Operating System Monitor (104) generates primitive Operating System events (108). This is done by trapping primitive operating system calls (e.g., open a file) via a library. When a system call occurs, a corresponding primitive event is generated; the format and information contained in that packet are described later in FIG. 7. The library traps system calls that are generated by all computer programs, including tools, that run under the Operating System (103), without requiring any enveloping or modifications to these programs. The choice of system calls to be filtered can be decided dynamically on a per-command basis. In a preferred embodiment, the library is dynamically linked, as disclosed in Eduardo Krell and Balachander Krishnamurthy, "COLA: Customized Overlaying", *Proceedings of the USENIX San Francisco Winter 1902 Conference*, San Francisco, Calif., 1992, pp. 3–7. The Operating System Monitor (104) in this reference is described in more detail by David G. Korn and Eduardo Krell in "A New Dimension for the UNIX File System", *Software Practice and Experience*, volume 20, number S1, June 1990, pp. 19–34.

The Translator (106) filters the primitive Operating System events (108) and matches them against the events stored in its Event Table (110). When all the events corresponding to a single step in the Step Table (109) have occurred, the Translator (106) sends a process step notification (107) to the Process Server (101) to notify it that the particular step has occurred. The Process Server can then use this information to perform other forms of computer-aided process control.

Figure 2:
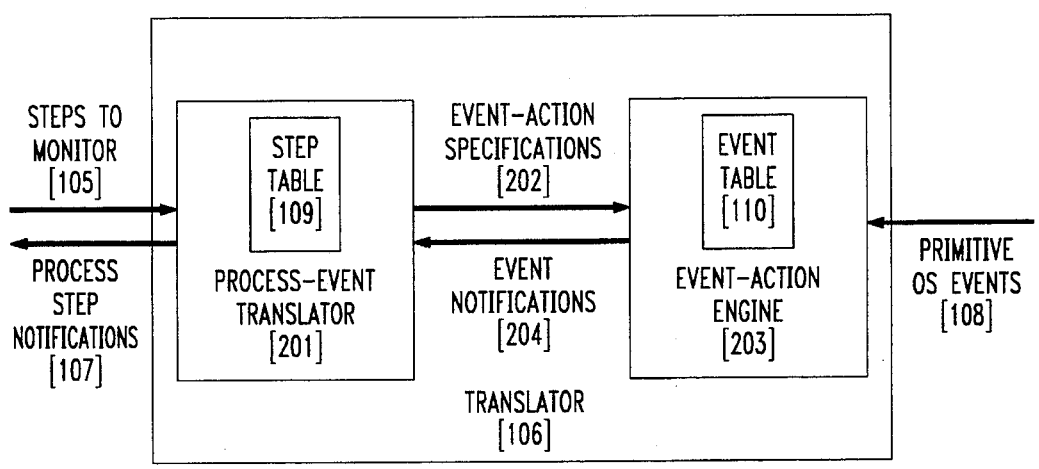
FIG. 2 is a breakdown of component [106] of FIG. 1 representing the Translator portion of the preferred embodiment.

FIG. 2 depicts the components of the Translator (106) in FIG. 1.

The Translator consists of two components: a Process-Event Translator (201) and an Event-Action Engine (203). The set of process steps to be monitored (105) is sent as input to the Process-Event Translator (201), whose task is to notify the Process Server when any of these steps has occurred. The Process-Event Translator (201) stores these steps in the Step Table (109), and for each step, it generates one or more event-action specifications (202), which are sent as input to the Event-Action Engine (203). The Event-Action Engine stores these specifications in the Event Table (110), as described earlier. The Event-Action Engine then matches these event specifications against the primitive Operating System events (108) generated by the Operating System Monitor (104). When a match occurs, an event notification (204) is sent to the Process-Event Translator (201).

An example Event-Action Engine is yeast, which described by Balachander Krishnamurthy and David Rosenblum in "An Event-Action Model of Computer-Supported Cooperative Work: Design and Implementation", *Proceedings of the International Workshop on Computer Supported Cooperative Work*, IFIP TC 6/WG C.5, April, 1991, pp. 132–145.

Figure 3:
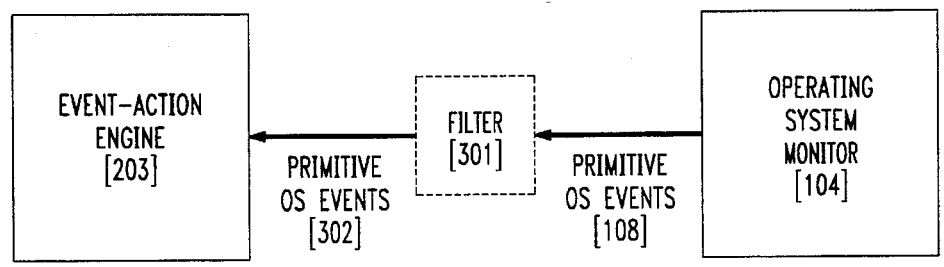
FIG. 3 is a diagram of the filter between the Operating System Monitor and the Event-Action Engine.

FIG. 3 describes the interface between the Operating System Monitor (104) and the Event-Action Engine (203) in more detail. The Filter (301) filters the primitive Operating System events (108) based on the steps and entities modeled in the Operating System portion of the process server (102) and supplies these events to the Event-Action Engine (203). More specifically, the Translator (106) provides the Filter (301) two pieces of information: the list of primitive operating system calls to monitor, and a list of entities (e.g., files and directories) to monitor. This information is extracted directly from the Operating System portion in the Process Server (102). Based on this information, the filter ignores system calls that do not correspond to these two lists, and sends the rest of the system calls to the Event-Action Engine (203). Thus, only those primitive Operating System events that are relevant to the process are supplied to the Event-Action Engine.

FIG. 3 shows the Filter (301) as a dashed box because it can be implemented in various ways. More specifically, it can be tightly coupled to the Operating System Monitor (104) or to the Event-Action Engine (203), or can be a separate component in the middle. The primitive Operating System events (108) generated by the Operating System Monitor have to be converted into an input format that is suitable for the Event-Action Engine (203). However, the input format conversion is done in the Event-Action Engine itself and is not shown in this figure.

Figure 4:
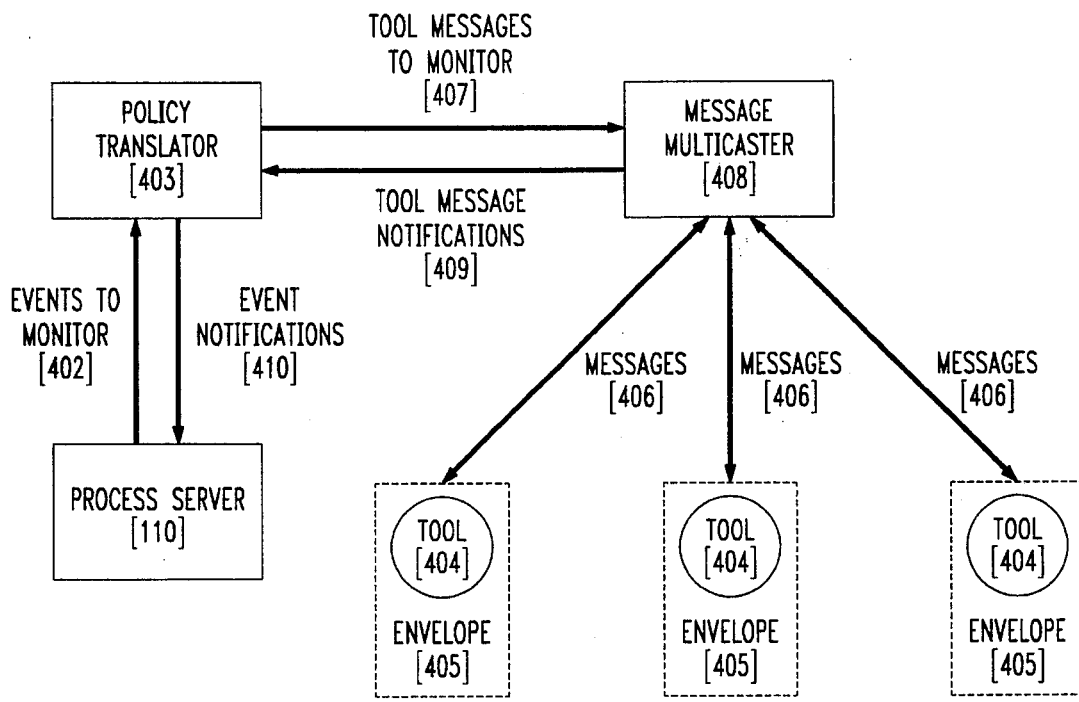
FIG. 4 shows the state of prior art.
Figure 5:
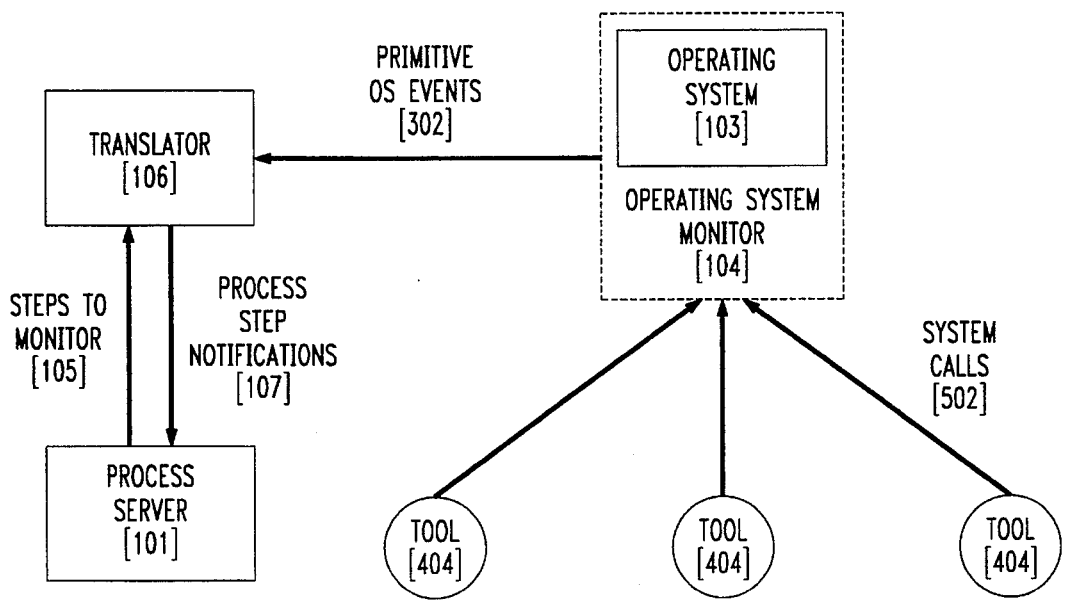
FIG. 5 depicts a comparison between the prior art and the preferred embodiment of the process control system.

FIG. 5 compares the Preferred Embodiment of the Process Control System of FIG. 1 to the prior art of FIG. 4. Instead of enveloping each tool separately as in FIG. 4, we envelope the Operating System (103) by a single envelope, the Operating System Monitor (104). The system calls (low level Operating System primitives) generated by the tools (502) are filtered by the monitor (104) around the Operating System (103). The Operating System Monitor (104) sends primitive Operating System events (302) to the Translator (106). The rest of the figure is similar to prior art in the sense that the Process Server (101) notifies the Translator (106) of process steps to be monitored (105) and receives process steps notifications (107) in return. Although FIG. 5 does not show this, the preferred embodiment, unlike the prior art, can monitor non-tool based Operating System primitive events, as shown in FIG. 6.

Figure 6:
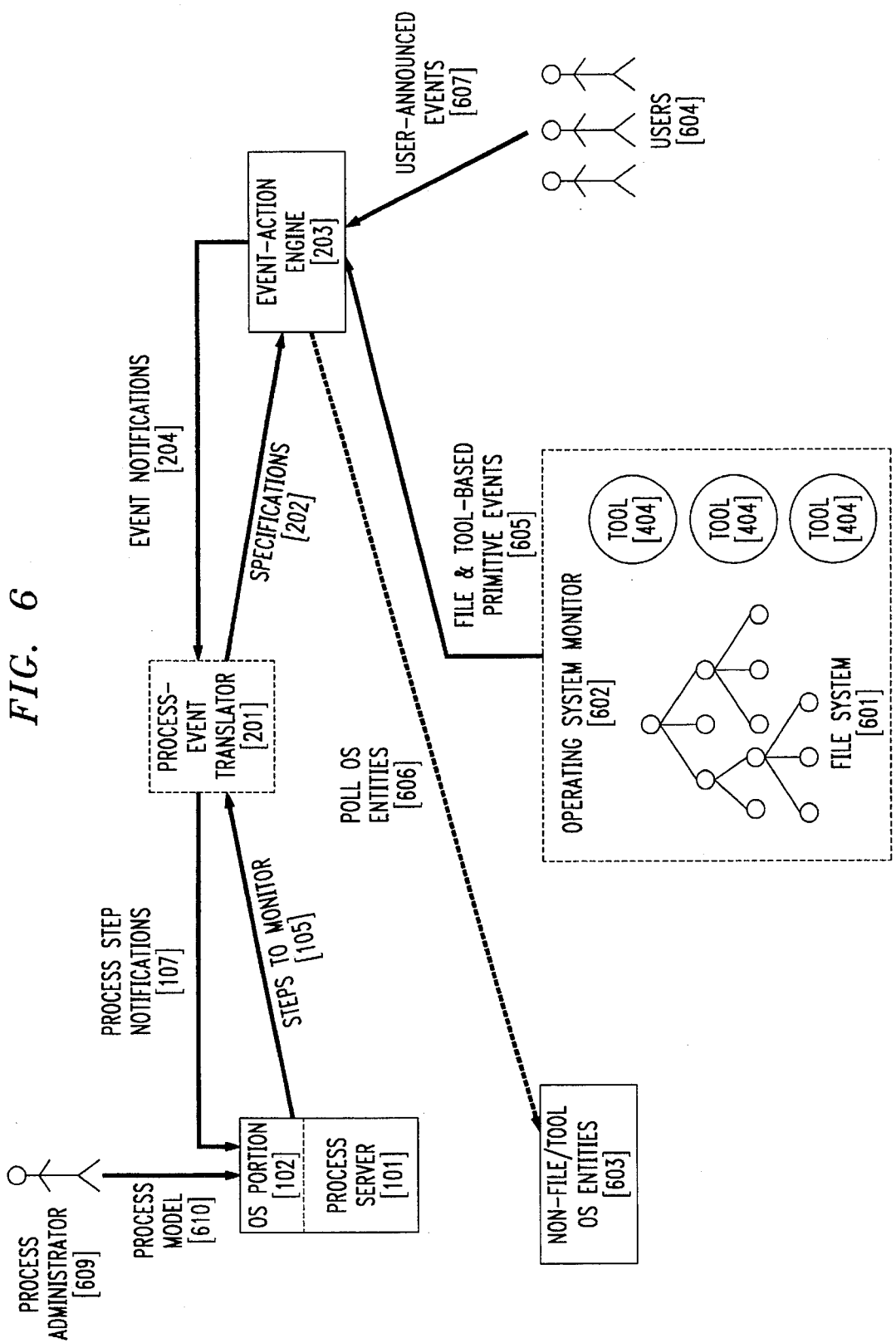
FIG. 6 is a diagram of a realization of the preferred embodiment of the process control system.

FIG. 6 shows a realization of the Preferred Embodiment of the Process Control System (6). We describe this figure in two steps. First, we explain how a process model is translated into events that can be monitored; then, we explain how these events are actually automatically detected.

The Process Administrator (609) supplies a process model (610) to the Process Server (101). The Process Server (101) contains the Operating System portion, as described earlier. In the preferred embodiment, the process server is Marvel. Marvel represents the entities involved in the process as typed objects whose state represent the state of the process.

State transitions occur by firing rules. Consequently, completion of a process step results in the firing of one or more rules, and as a result of those firings, the state of the objects is changed to reflect the completion of the step.

The operating system portion of Marvel consists of rules which operate on objects representing four kinds of entities: monitored tools, monitored files, monitored user-announced events, and monitored temporal events. For each kind of entity, the corresponding rules are fired when Marvel receives a step notification. All of these steps will be monitored, as described later.

From this portion, a set of steps that can be monitored (105) is supplied to the Process-Event Translator (201), based on the type of monitored entity. For example, for a monitored tool, three kinds of steps must be monitored: beginning of the tool invocation, suspension of the tool invocation, and termination of tool invocation. For a monitored file, the steps to monitor include modification of the file and deletion of the file.

The Process-Event Translator (201) translates each of the steps into a set of event-action specifications (202) and registers them with the Event-Action Engine (203). For example, the process step "file x modified" causes the generation of a specification of the form "If file x is opened and then file x is written and then file x is closed, send a notification that file x has been modified."

If the event pattern of a specification is matched, the Event-Action Engine (203) sends an event notification (204) to the Process-Event Translator (201). The Process-Event Translator (201) converts these notifications into the corresponding process steps and notifies the Process Server (101) that the particular step has occurred (107).

The Event-Action Engine (203) matches the event-action specifications (202) against three categories of events. The first are events that occur on Operating System entities (603) that are neither tools nor files. An example of such an event is "the load on a machine exceeding a certain threshold." These events are polled (606) by the Event-Action Engine.

The second category of events are file and tool-based primitive events (605). The Operating System Monitor (602) monitors the file system and the tools in order to supply these events to the Event-Action Engine (203). No polling on the part of the Event-Action Engine is required for these events. Note that the Operating System Monitor (602) is slightly more limited than the Monitor (104) described in FIG. 1 because it detects events on files and tools only; the Operating System Monitor (104) in FIG. 1 can detect conceptually all primitive Operating System events.

The third category of events are generated by Users (604). The users directly notify the Event-Action Engine (203) via user-announced events (607). The Event-Action Engine we use in this realization provides a mechanism for users to notify it about arbitrary events. For example, the Yeast event-action engine provides an announcement client to achieve this. The user announcement mechanism generates a packet of the format shown in FIG. 8, for every user-announced event (607).

Figure 7:
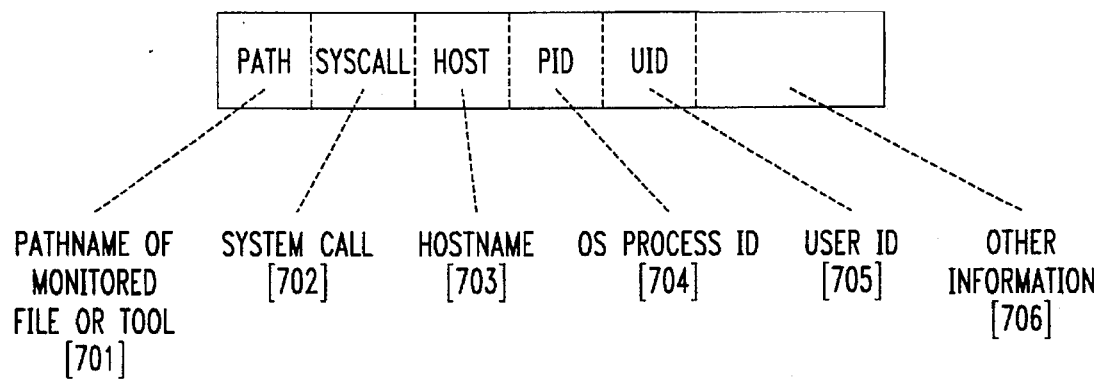
FIG. 7 is a diagram of the data format of the primitive Operating System event packet.

FIG. 7 is a diagram of the Data Format of a Primitive Operating System Event Packet. The Operating System Monitor (104) generates such a packet for each primitive Operating System event (203). The first component is the path name of the Operating System entity (701) on which the primitive event occurred. The next field is the system call (702), which corresponds to the Operating System primitive event. The third field is the name of the machine-hostname (703) from which the packet is sent. The next field is the identifier—pid (704) assigned by the Operating System to the process generating the packet. The fifth field is the user identifier—uid (705) of the user whose action caused the generation of the packet. The rest of the packet (706) is for other related information that we do not use in the current realization but may be of value in future realizations.

The Primitive Operating System Event Packet described in FIG. 7 is sent as input to the Event-Action Engine (203). This is then matched against the event patterns stored in the Event Table (110). If the generated event packet of FIG. 7 matches against one of the event patterns in the Event Table (110), the corresponding action—event notification (204) is sent to the Process-Event Translator (201).

Figure 8:
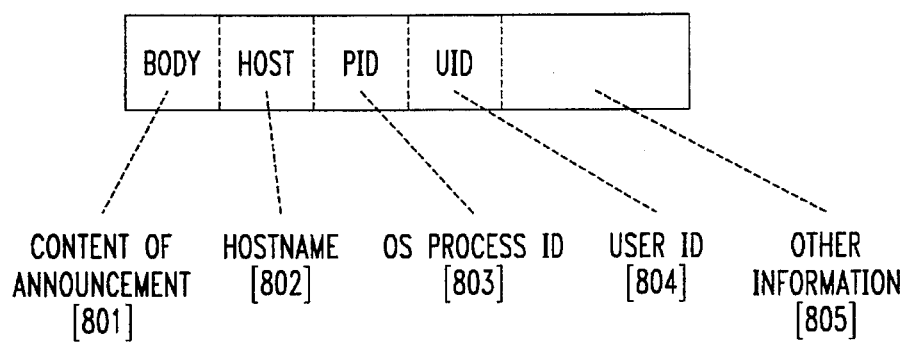
FIG. 8 is a diagram of the data format of user-announced events.

FIG. 8 shows the format of a User-Announced Event Packet generated by the announcement mechanism of the Event-Action Engine (608). The first component is the content of the announcement (801). This may include information about the particular process entity, such as the value of one of its attributes. The other fields of the packet are the name of the machine from which the user sends the announcement—hostname (803), the operating system process identifier—pid (804) of the process generating the packet, the user identifier—uid (805) of the user whose action caused the generation of the packet, and miscellaneous other information (805) that we do not use in the current realization but may be of value in future realizations.

The User-Announced Event Packet described in FIG. 8 is sent as input to the Event-Action Engine (203). This is then matched against the event patterns stored in the Event Table (110). If the generated event packet of FIG. 7 fully matches against one of the event patterns in the Event Table (110), the corresponding action—event notification (204) is sent to the Process-Event Translator (201). The event patterns in the Event Table (110) can have complex event patterns; thus it is possible for multiple events of the form shown in FIG. 7 to be generated before the event pattern in the Event Table (110) is fully matched.

Figures 9A, 9B:
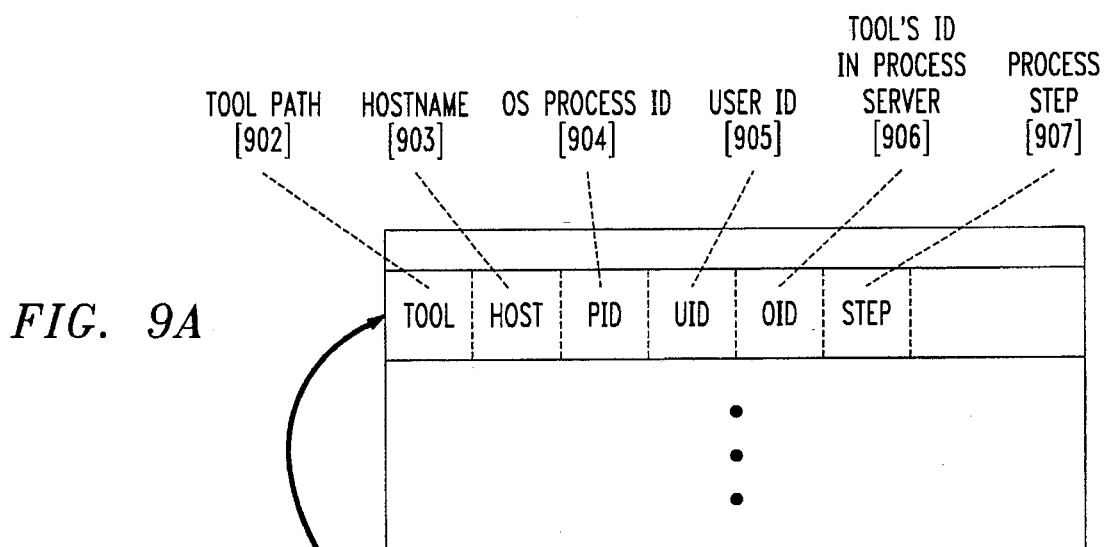
FIG. 9 is a diagram of the data structure that the Translator component [106] uses to maintain information about monitored tools and files that are relevant to the process.

FIG. 9 is a diagram of the data structures of the Process-Event Translator (201) of the Process Control System. The data structures store information about monitored events and entities, and the corresponding process steps.

The Table of Monitored Tools (901) has an entry for each invocation of any tool of interest to the process. An entry is created in this table whenever the Process-Event Translator (201) receives an event notification from the Event-Action Engine (203), indicating that a monitored tool has been invoked (the Operating System Monitor (104) has generated a primitive Operating System event corresponding to the beginning of the execution of the tool). An entry is removed upon completion of the corresponding tool invocation. The list of tools of interest to the process is extracted from the set of steps to monitor (105) supplied by the Process Server (101). Each entry consists of six fields. The first is the pathname of the tool (902) that was invoked; the second is the name of the machine—host (903) from which the tool was invoked, followed by the identifier—pid (904) of the Operating System process of the tool invocation. The fourth field is the user identifier—uid (905) of the user invoking the tool, followed by the identifier of the tool object (906) in the Operating System Portion (102) of the Process Server. The last field stores the name of the process step (907) corresponding to this invocation of the tool.

The second table in the figure is the Table of the Monitored Operating System Files (908). An entry is created in this table whenever the Process-Event Translator (201) receives an event notification from the Event-Action Engine (203), indicating that a monitored file has been accessed (the Operating System Monitor (104) has generated a primitive Operating System event corresponding to the access of the file, such as opening or writing). The entry is removed when the access is completed (e.g. the Operating System monitor generates a "file close" event). Each entry in this table has four fields. The first is the pathname of the file (909). The second field is a boolean value (910) that indicates whether or not this access to the file is by one of the monitored tools; if so, then the third field stores a pointer (911) to the entry of the corresponding tool in the Table of Monitored Tools (901). If the access is not by one of the monitored tools, the third field is set to NULL (i.e., empty). The last item is a boolean value (912) indicating whether or not the file has been modified during this access. The table shown depicts two entries. The first entry at position i (913) is for a file that is being accessed by a monitored tool, and thus the third field has a pointer (911) to an entry in the Table of Monitored Tools; the fourth field indicates that the file has not yet been modified by the tool. The second entry at position j (914) is for a file (perhaps the same file in the entry at position i) that is being accessed by a tool that is not monitored (i.e., irrelevant to the process) and thus the third field is NULL.

Example Usage of the Apparatus

To illustrate the realization of the preferred embodiment we present an example usage of the apparatus. For our example we choose Marvel (q.v.) as the Process Server (101) and Yeast (q.v.) as the Event-Action Engine (203).

The example postulates a business planning team creating a business plan. The process for developing the plan specifies that whenever the business plan is modified, the requirements architects need to be notified about it so that they can modify the requirements document accordingly. The process model specifics that the business plan is an entity whose type is "Monitored-File".

Since the business plan is a monitored file that resides on the Operating System, the process steps that occur on it are part of the Operating System portion of Marvel. As explained earlier, these steps include: modifying the file, creating it, and deleting it. The three steps are supplied to process-event translator (201) as steps that should be monitored (611).

Process-event translator (201) generates event-action specifications (613) corresponding to these three steps, as described earlier. The event-action specifications are stored in the Event Table (110) of the Event-Action Engine (608).

Whenever changes occur in the file system the Operating System Monitor (104) generates primitive events and sends them to the Filter (301). These events are filtered by the filter and only events of interest to the particular process are sent to the Event-Action Engine (203). Thus, when the business plan is opened by a user participating in the process, the Operating System Monitor (104) detects it and generates a primitive Operating System event packet (FIG. 7). These events are filtered by the Filter (301) and sent to the Event-Action engine (203) which matches them against the events in its Event Table (110).

Similarly, when the business plan file is written and eventually closed, event notifications will be sent to the Event-Action Engine, which again matches them. Only when the "close file" event is matched, will the step "file business plan modified" be matched in process-event translator 201.

Note that the members of the business planning and architecture teams work without unnecessary intrusions by the process control system since they do not have to inform the system manually about events that can be detected automatically. Moreover, they can use any tools (editors, formatters, etc.) to perform their activities. The advantages of non-intrusiveness through automatic data capture, and open environments are reflected in the simple example above.

Conclusion

The foregoing Detailed Description has disclosed to those of ordinary skill in the art the best mode presently known to the inventors of implementing and using their novel process control techniques. The description has shown how the techniques may be used to control processes whose end products are writings such as computer programs or business plans; however, as will be immediately apparent to those of ordinary skill in the art, the techniques may be used to control any kind of process, including business processes, design processes, production processes, and legal processes.

Further, the techniques of the invention may be implemented in many ways which are different from those disclosed herein. For example, any device, not just the operating system, may be monitored; further, Yeast is only one of many possible devices for monitoring the events produced by the operating system, and Marvel is only one of many possible process servers.

Since the foregoing is the case, the Detailed Description is to be understood as being in all respects illustrative and exemplary and not limiting, and the scope of the inventions disclosed herein is to be determined not from the Detailed Description, but rather from the attached claims as interpreted with the full breadth permitted by the law.

What is claimed is:

1. Apparatus for controlling a process defined as an ordered set of steps, each of said steps defined as a set of at least one event, at least a portion of the process being performed in a device and the apparatus comprising:

means responsive at least to events in the device for generating event messages;

means having a modifiable representation of the process which includes a representation of a step of the process which is performed in the device; and means for automatically generating a set of events to monitor based on the representation of the step and which selectively responds to the event messages as required by the generated set of events and initiates modification of the modifiable representation as required by the event messages.

2. The apparatus set forth in claim 1 wherein the means which selectively responds to the event messages comprises:

means, including a description of a sequence of events, for responding to the event messages by producing an event notification message upon receiving event messages indicating the sequence of events has occurred in the device; and means, including a description of a step of the process which is performed in the device, for producing the description of the sequence of events from the description of the step and providing the description of the sequence of events to the means for responding to the event messages and responding to the event notification message by modifying the modifiable representation as required by the event notification message.

3. The apparatus set forth in claim 2 wherein the means for responding to the event messages further comprises:

means for polling the device to determine whether the device is in a given condition and when the device is in the given condition, responding as for an event message.

4. The apparatus set forth in claim 2 wherein the means for responding to the event messages further comprises:

means for responding to a message from a user of the apparatus as for an event message.

5. The apparatus set forth in claim 2 further comprising:

a rule-based expert system which includes the modifiable representation of the process and which responds to modifications thereof by firing rules belonging to the rule-based expert system.

6. The apparatus set forth in claim 1 wherein the means responsive to events in the device comprises:

an envelope for the device.

7. The apparatus set forth in claim 6 wherein the envelope comprises:

one or more dynamically-linkable library routines to which the device responds by performing operations and which further produce the event messages.

8. The apparatus set forth in claim 7 wherein:

the device is the operating system of a computer system; and the dynamically-linkable library routines include at least routines for performing operations on files.

9. The apparatus set forth in claim 1 wherein:

the device is an operating system for a computer system.

10. The apparatus set forth in claim 1 further comprising:

a rule-based expert system which includes the modifiable representation of the process and which responds to modifications thereof by firing rules belonging to the rule-based expert system.

11. Apparatus for controlling a process defined as an ordered set of steps, each of said steps defined as a set of at least one operation event, at least a portion of the process being performed by means of operations performed by a device, the apparatus comprising:

means responsive to the operations for generating operation event messages;

means for automatically generating a set of operation events to be monitored based on a description of at least one step in the process;

means responsive to the operation event messages for comparing the operation event messages to the generated set of operation events and selectively generating a process step message indicating that a step of the process has been performed; and means separate from the means responsive to the operation event messages which are responsive to the process step message for controlling the process as required by the process step message.

12. The apparatus set forth in claim 11 wherein:

the device is an operating system.

* * * * *